Patented Mar. 30, 1926.

1,578,820

UNITED STATES PATENT OFFICE.

CLARENCE M. GERE, OF BRODHEAD, WISCONSIN, ASSIGNOR TO KRAFT CHEESE COMPANY, OF CHICAGO, ILLINOIS, A CORPORATION OF ILLINOIS.

SKIM-CHEESE MANUFACTURE.

No Drawing. Application filed May 18, 1925. Serial No. 31,213.

*To all whom it may concern:*

Be it known that I, CLARENCE M. GERE, a citizen of the United States, and a resident of Brodhead, in the county of Green and State of Wisconsin, have invented certain new and useful Improvements in Skim-Cheese Manufacture, of which the following is a specification.

My invention relates to improvements in the manufacture of skim cheese, i. e., cheese made out of milk from which all or a major portion of the butter fat has been first removed.

Such cheese being made from such a relatively inexpensive material as skimmed milk, costs much less to manufacture than full cream cheese, i. e., cheese made from the whole milk which contains its original butter fat content. Skim cheese, because of its relatively low cost, may be purchased and consumed in relatively large quantities by the poorer classes who cannot afford to buy a full cream cheese. Also, because of the absence of butter fat, skim cheese can be distributed more successfully in tropical or semitropical countries where high temperatures are encountered.

On the other hand, the making of skim milk cheese has heretofore presented some problems which are not encountered in manufacturing a full cream product. For example, great difficulty has been experienced in preventing the cheese from blowing up or swelling during the curing process. Also, when making skim milk cheese by some of the old processes, it has required a very long time, usually about six months, to effect the curing or ripening to the stage where the product is fit for consumption.

The principal objects of my invention are to provide a process of making skim cheese where the danger of swelling or blowing up of the product while curing, is almost if not completely eliminated, when ordinary care is used; to provide a process of manufacture which will enable the curing to be effected in a relatively short time; to provide a process for producing a skim cheese of improved flavor, body and palatability and of superior alimentary value, and in general, to provide an improved process and product of the character referred to.

In describing my invention I will take as an example, a specific process which I have successfully practiced in making skim cheese from milk produced in the neighborhood of Antigo, Wisconsin, omitting such process details as are well understood by persons skilled in the art of manufacturing American, i. e. Cheddar cheese.

*Example.*—After removing the butter fat from the whole milk as received from the farmer, this being effected by means of an ordinary separator, I then pasteurize the skim milk. Such pasteurization may be effected by the holding method, in which a temperature of about 144° F. is maintained for approximately thirty minutes, or it may be effected by the flash process at 165° F. The milk is then immediately cooled down to a temperature of slightly less than 90° F. and preferably 88° F.

To the cooled skim milk I now add from 3 to 4% of lactic acid starter and I then add sufficient rennet to complete coagulation in about twenty to thirty minutes, preferably not more than thirty minutes. The curd is then cut or shredded into small chunks in the usual way, these chunks ordinarily measuring 3/8 by 3/8 by 1/2 inches in dimension. The curd is then stirred carefully for about ten minutes before beginnning to draw the whey. All of the whey should be drawn off or discharged within twenty minutes from the time of cutting or shredding the curd.

After drawing the whey, the curd is piled about eight inches deep and as soon as firm enough, is cut into blocks of the usual dimensions, ordinarily about 10 by 15 by 8 inches. Then the blocks of curd are piled and repiled in the usual manner, but preferably not more than two blocks deep at any time. The re-piling or cheddaring process is continued for about two hours during all of which time, the original temperature (of about 88° F.) is maintained.

After the cheddaring step is completed, the curd is milled and then spread evenly in the same vat. After such spreading it is covered with a portion of the whey which was previously drawn off from the same curd and which after drawing has been promptly cooled to a temperature of 70° F. or less, preferably not more than 60° F. Warm whey of high acidity is not desirable for this purpose as it has a tendency to contract the curd and prevent absorption. The milled curd thus spread in the vat is allowed to stand covered with the whey and soak for about twenty minutes, during which time it may be stirred or raked every few minutes. At the end of twenty minutes the curd will have absorbed a large quantity of the cold whey and the remaining whey is then drained off.

After the cool whey has been drained off from the curd, the curd is salted in the usual way, using about one pound to one and one-half pounds of salt for each one thousand pounds of milk originally treated. Then the curd, which, because of its contact with the cold whey has cooled considerably, is warmed up to about 88° F. and put in the press in the ordinary manner. It is then cured in the ordinary way.

I find that according to my improved process the curing can be effected in about thirty days as compared with the old practice which requires about six months. This possibly is due to the fact that the cheese contains much more water than when made according to heretofore existing methods in addition to which, because of the absorption of whey, it contains much more milk sugar and milk salts, which have an important effect in promoting the growth or development of the bacteria which are instrumental in effecting the ripening of the product.

Skim cheese made according to my process will rarely, if ever, swell or blow up or otherwise lose its shape during the curing, and is a much more presentable product than cheese made under the old process. Also, because of the higher percentage of water, it is not so dry to the taste as former skim cheese, and it has a much improved flavor and body. Furthermore, because of the fact that it contains a relatively large percentage of milk sugar and milk salts, which were contained in the whey which the curd absorbed during the process, the alimentary value of the product is relatively high.

The scope of my invention should be determined by reference to the appended claims, said claims to be construed as broadly as possible, consistent with the state of the art.

I claim as my invention:

1. The improvement in the art of making cheese from skim milk which consists in producing a curd, drawing off the whey, working the curd after the whey has been drawn, and then soaking the curd in the whey which was drawn off from the curd in the same batch.

2. The improvement in the art of making cheese from skim milk which consists in producing a curd, drawing off the whey, working the curd after the whey has been drawn, and then soaking the curd in whey which has been cooled after drawing.

3. The improvement in the art of making cheese from skim milk which consists in co-agulating the skim milk at a temperature of slightly less than 90° F. thereby producing a curd, drawing off the whey, cutting up and cheddaring the curd while maintaining said temperature, and then soaking said curd in whey which has been cooled substantially after drawing.

4. The improvement in the art of making cheese from skim milk which consists in co-agulating skim milk to form a curd therefrom, drawing off the whey, cutting and piling the curd, then spreading the curd and then soaking the curd in whey of the same batch which has been cooled after drawing.

5. The improvement in the art of making cheese of skim milk which consists in co-agulating skim milk to produce and form a curd, drawing off the whey, cutting up and working the curd after the whey has been drawn, and then soaking the curd in whey which has been cooled substantially after drawing, thereby causing the curd to absorb a substantial percentage of said cooled whey, then drawing off the whey and pressing and curing the resultant product.

6. The improvement in the art of making cheese of skim milk which consists in co-agulating skim milk at a temperature of substantially 88° F. to produce and form a curd, drawing off the whey, working the curd after the whey has been drawn, while maintaining substantially said temperature, then soaking the curd in whey which after drawing has been cooled to a temperature of 70° F. thereby causing the curd to absorb a substantial percentage of such cooled whey, then draining off the surplus whey, pressing and curing.

7. The improvement in the art of making cheese of skim milk which consists in co-agulating skim milk at a temperature of substantially 88° F. to produce and form a curd, drawing off the whey, working the curd after the whey has been drawn, while maintaining substantially said temperature, then soaking the curd in whey which after drawing has been cooled to a temperature of 70° F. thereby causing the curd to absorb a substantial percentage of such cool whey, then draining off the surplus whey, warming the curd to substantially its original temperature, pressing and curing.

CLARENCE M. GERE.